UNITED STATES PATENT OFFICE.

ELIZABETH S. TUTLEMAN, OF CINCINNATI, OHIO, ASSIGNOR OF ONE-HALF TO CHARLES L. HOPPING, OF CINCINNATI, OHIO.

HEAT-NEUTRALIZING COMPOUND.

1,204,830.  Specification of Letters Patent.  Patented Nov. 14, 1916.

No Drawing.  Application filed July 30, 1915. Serial No. 42,815.

*To all whom it may concern:*

Be it known that I, ELIZABETH S. TUTLEMAN, residing at Cincinnati, Hamilton county, State of Ohio, have invented a certain new and useful Heat-Neutralizing Compound, of which the following is a clear, full, and exact description.

This invention consists of a certain compound which tends to oppose conditions favoring generation of heat if it is applied to surfaces where such conditions exist, and it also induces reduction of high temperatures if they are present in such surfaces.

The compound is of a pasty consistency and is particularly well adapted for use as a lubricant to be applied to shaft-bearings, axle-journals and to moving machine-parts in general. When so used it prevents generation of heat in the contacting surfaces between which it is applied. It is also useful in cases of injuries by burns and if applied to the injured parts, alleviates the pain and induces an expeditious healing process. The compound being odorless, it becomes particularly well adapted for such use.

The compound consists substantially of a certain mixture of oil and of lime slaked with water, soda ash being added to emulsify the ingredients and to convert them into a homogeneous mass of smooth consistency.

In preparing the compound the lime is dissolved and slaked in water and carefully sifted and strained to remove non-soluble and gritty parts; soda-ash is scalded and likewise strained and sifted for the same reason. Oil is added to the lime and the soda-ash is incorporated whereby the oil is saponified. Ocher is added to give color to the mass which is then thoroughly mixed by stirring and agitation. In preparing a batch of this mixture I have found it preferable to use the following substances and in the proportions stated as giving the best results:

| | |
|---|---|
| Lime | 13 pounds. |
| Water | 3½ gallons. |
| Black mineral oil | 7½ pounds. |
| Red oil | 2½ pounds. |
| Soda ash | 2½ pounds. |
| Yellow ocher | 1 pound. |

By "black mineral oil" I mean a residuary petroleum product and by "red oil" I mean oleic acid.

It will be observed that in this mixture the mineral constituents, viz, lime and ocher, proportionately exceed the oil ingredients, and the water exceeds both mineral and oil ingredients, but perfect homogeneity is nevertheless obtained due to the action of the soda-ash which is present in substantial quantity equaling about one fourth of both oil ingredients. The compound which results is of substantial body due to the presence of the mineral matter and attains a consistency equal to that of lard and this consistency remains constant because no heat is used in the manufacture of the compound which would induce separation of the oily matter from the mineral matter and water.

Having described my invention, I claim as new:

1. A homogeneous compound of lard-like consistency for the purpose described which consists of oil, lime and water and in which the lime proportionately exceeds the oil, while the water exceeds both, the ingredients being emulsified to form a mass of substantial body by saponification by means of soda-ash added to them, the mass being rendered smooth and homogeneous by stirring and by agitation.

2. A homogeneous compound of lard-like consistency for the purpose described which consists of oil, lime, ocher and water and in which the mineral matter proportionately exceeds the oil, to provide body, the ingredients being emulsified to form a mass of substantial body by saponification by means of soda-ash added to them, all being rendered smooth and homogeneous by stirring and by agitation.

3. A compound consisting of a homogeneous mass of substantial body of lard-like consistency and produced by combining in the manner described, the ingredients hereinafter named in the following proportions: lime 13 pounds, water 3½ gallons, black mineral oil 7½ pounds, red oil 2½ pounds, soda-ash 2½ pounds and yellow ocher 1 pound.

In testimony whereof I hereunto affix my signature this 29th day of July, 1915, in the presence of two witnesses.

ELIZABETH S. TUTLEMAN.

Witnesses:
  C. SPENGEL,
  A. JOHNSON.